United States Patent [19]

Sittenfield

[11] Patent Number: 4,477,357
[45] Date of Patent: Oct. 16, 1984

[54] DETOXIFICATION OF SUBSTANCES BY UTILIZATION OF ULTRASONIC ENERGY

[75] Inventor: Marcus Sittenfield, Laverock, Pa.

[73] Assignee: Hazardous Waste Management, Inc., Woodbridge, Va.

[21] Appl. No.: 529,483

[22] Filed: Sep. 6, 1983

[51] Int. Cl.³ .................................................. B01J 3/08
[52] U.S. Cl. .................................. 210/748; 204/158 S
[58] Field of Search ...................... 204/158 S, 157.1 S; 210/748

[56] References Cited

U.S. PATENT DOCUMENTS 4,144,152  3/1979  Kitchens ........................ 204/158 R
4,340,488  7/1982  Toth et al. ........................ 204/158 S

OTHER PUBLICATIONS

Weissler, J. Acoustica Soc. of America, vol. 25, No. 4, (Jul. 1953), pp. 651–657.
Boucher, British Chemical Engineering, vol. 15, No. 3, (Mar. 1970), pp. 363–367.

*Primary Examiner*—Howard S. Williams
*Attorney, Agent, or Firm*—Arthur A. Jacobs

[57] ABSTRACT

Process for detoxifying liquid and perverulant solid material by the application of ultrasonic energy to the material in the presence of an alkaline agent and preferably in the additional presence of a wetting agent.

8 Claims, No Drawings

DETOXIFICATION OF SUBSTANCES BY UTILIZATION OF ULTRASONIC ENERGY

This invention relates to the removal of toxic contaminants from liquid or solid materials and it more specifically relates to the molecular conversion of such contaminants into a less hazardous substance by the use of ultrasonic energy.

It is known that ultrasonic energy may effect various physical and chemical changes. In this respect, it has previously been proposed to use ultrasonic energy to initiate such chemical reactions as polymerization, depolymerization, oxidation, dehalogenation, hydrocarbon cracking, etc.

The mechanism by which ultrasonic waves produce chemical change involves the phenomenon of cavitation, which is the formation of cavities (bubbles in a liquid) which are filled with such gas or vapor as may be present in the material itself or in the surrounding atmosphere, and the rapid collapse of these cavities or bubbles. This collapse produces very large amplitude shock waves with an accompanying very rapid increase in temperature. It appears that not only gas and liquid particles but solid particles or other types of discontinuities may act as nuclei for the initiation of cavitation. These cavities or bubbles take many cycles to grow to what is known as resonant size, at which point they collapse instantly and violently in one cycle. These collapses produce high local pressures of up to about 20,000 atmospheres while the temperatures attained in the collapsing cavities may be as high as 10,000° K. Although this rise in temperature is not only rapid but transitory, it is, nevertheless, present for a sufficient time to initiate the aforementioned chemical changes, and especially the formation of free radicals by the disassociation of the molecular bonds of the material being treated. These free radicals may then react with other molecules to form additional free radicals, thus propagating a chain reaction, or may combine to terminate the chain reaction by forming new molecules which may either be more desirable or which may be readily extracted from the material being treated.

Waves in the lower portion of the ultrasonic frequency range, usually about 20 KHz, are generally used because at such frequencies the resonant cavity size is relatively large and, therefore, collapses with greater force than cavities produced at higher frequencies. On the other hand, the amplitude of the resultant shock wave is a significant factor because the yield of a chemical reaction subjected to ultrasonic waves is directly proportional to the intensity of cavitation and the cavitation intensity is proportional to the amplitude of the wave. The amplitude of the wave is, itself, dependent on viscosity; the higher the viscosity of the reactant medium, the lower the amplitude and the lower the pressure exerted by the collapsing cavities. There has, in addition, been evidence that there is a direct proportionality between the amplitude of the ultrasonic wave and the amplitude of the transducer surface that creates the wave and that this, in turn, is proportional to the chemical activity.

In accordance with the present invention, the use of ultrasonics is applied to the detoxification of both liquid and perverulant solid material, and, more particularly, to the elimination therefrom of polychlorinated biphenyls, dioxins and similar toxic or undesirable contaminants of a type which are ordinarily chemically stable and, therefore, difficult to destroy, while at the same time, not destroying the treated material itself.

Heretofore, in order to remove polychlorinated biphenyls or similar aromatic contaminants from oil or the like, it was necessary to subject the oil to very high temperatures. However, these high temperatures not only effected some removal of the contaminants but also resulted in a degradation of the oil itself due to the effects of polymerization, oxidation or other side reactions caused by the heat.

Ordinarily, although subjection of the contaminants to ultrasonic radiation would result in some cleavage and dehalogenation of the aromatic ring, the results would be minimal because of the rapid but transitory nature of the cavitation reaction. There would just not be sufficient time to obtain a significant amount of cleavage or dehalogenation before equilibrium was reached and the free radical chain reaction was terminated.

In accordance with the present invention, it has been discovered that the presence of a relatively small amount of an alkaline agent in the medium being treated significantly accelerates both the dehalogenation and the decomposition of the aromatic ring structure. In this respect, although a liquid medium such as a reclaimed transformer oil, which is contaminated with ortho-dichlorobenzene, when subjected to ultrasonic radiation, causing cavitation, shows some slight evidence of destruction of the contaminant, it is significantly less than that shown in the following examples. At the same time, because of the short reaction time, there is no significant degradation of the oil in the process of the present invention since there is insufficient time for the generated heat to effect any polymerization, oxidation or any other deleterious side reaction in the oil.

Although many alkaline agents such as sodium hydroxide, potassium hydroxide, sodium carbonate, calcium carbonate, sodium peroxide, and others, may be used for the present purpose, it has been shown that this alkaline agent not only has a superior accelerating action but is readily available, relatively inexpensive and easily handled.

It has also been discovered that when a very small amount of a wetting agent is added prior to the subjection of the liquid medium to the ultrasonic radiation, the amount of destruction of the contaminants is even further increased, although there is still no significant degradation of the medium itself.

The alkaline agent should be present in the starting mixture in an amount that is at least as high as the halogen equivalent of the medium in the mixture. In general, there is no required maximum concentration of the alkaline agent; however, for most purposes, it is usually not greater than 10 and preferably between about 2 to 3 times the halogen equivalent of the medium in the mixture. Insofar as concerns the wetting agent, it can be as high as 1%, but is preferably in the range of about 0.01 to 0.1 weight percent of the mixture. Typical of the type of wetting agents that may be used are the simple sulfated and sulfonated compounds such as the polyalkyl benzene sulfonates and the sulfonated simple terpenes as well as the simple non-ionic surfactants of the polyethenoxy and the polymeric ester types. Examples of such compounds are "Pluronic" F68, F87, F127 and 25R8 and sodium dioctyl sulfosuccinate (American Cyananide "OT-75").

The following examples are illustrative of the invention:

EXAMPLE 1

A reclaimed transformer oil containing 2.3% by weight of ortho-dichlorobenzene was used. The oil itself had a color of 1.5, a neutralization number of 0.5 mg KOH/g a flash point of 140° C., a specific gravity of 0.885, a water content of 15 ppm by weight and a kinetic viscosity of 11.0 cs at 40° C. To 110 ml. of this oil and ortho-dichlorobenzene composition was added, 2.0 ml. of 1.0 normal sodium hydroxide solution (2 milliequivalents of sodium ion).

The above-described mixture was placed into a sealed reaction well with a vapor vent and was subjected to ultrasonic radiation for 10 minutes by means of a transducer operating at a power level of 105 watts. The transducer was a "Heat Systems-Ultrasonic, Inc., Model 375", having a maximum power level of 350 watts at a frequency of 20 KHz and a maximum amplitude of 120 microns. The power level used was sufficient to cause cavitation. An ice bath was used to maintain the temperature at between 76° and 80° F.

Analysis by gas chromatograph of the resulting reaction product indicated that about 8.7 percent by weight of the ortho-dichlorobenzene had decomposed. The decomposition was further shown by treatment of the reaction product with a 1.0 N silver nitrate solution. Within a short time after addition of the silver nitrate solution a white precipitate was formed in the aqueous phase indicating the formation of silver chloride by the liberated chloride ion. The cleavage of the benzene ring was indicated by the subsequent formation of a black precipitate indicating the presence of acetylene which reacts with silver ion to form black silver acetylide.

EXAMPLE 2

A starting mixture identical in composition and quantity to that of claim 1, except that it also included, as a wetting agent, 0.025 ml. of sodium dioctyl sulfosuccinate (American Cyanamide "OT-75"), was introduced into the same type reaction well and was subjected to the same ultrasonic radiation at 105 watts for 6 minutes, during which cavitation occured. The reaction temperature was between 65° and 78° F.

The reaction product was analyzed in the same manner as in Example 1 and it was found that there was a destruction of about 34.8% by weight of the ortho-dichlorobenzene - a significant increase over the destruction obtained in Example 1 where the wetting agent was not used.

EXAMPLE 3

Into the same type reaction well as in Example 1 was introduced 100 ml. of the same type oil and ortho-dichlorobenzene composition that was used in claim 1. To this was added 74 mgs. of calcium hydroxide (2 milliequivalents of calcium ion) instead of the sodium hydroxide solution, and 5.0 ml. of water were added to provide an aqueous phase for testing. The same ultrasonic procedure was followed as in Example 1. The temperature range was 74° to 82° F. Analysis, such as in Example 1, indicated a destruction of the ortho-dichlorobenzene of about 17.4%.

Although the percentage of destruction in Example 3 was not as much as in Example 2 where a wetting agent was used, it doubled the percent of destruction as compared to Example 1 where the same equivalent of sodium hydroxide was used.

EXAMPLE 4

Into a reaction well of the type used in Example 1 was introduced 30 ml. of an oil mixture comprising transformer oil of the type used in Example 1 but containing 11 ppm of polychlorinated biphenyls (Monsanto "Aroclor 1254") and 1.0 normal sodium hydroxide solution containing 1 milliequivalent of sodium ion. The mixture was subjected to ultrasonic radiation at a power level of 98 watts for 4.5 minutes.

Analysis of the reaction product using silver nitrate solution in the same manner as in Example 1 showed results similar to those in Example 1.

Although an ice bath was used in each of the above examples to maintain the temperature at relatively ambient conditions, the reaction is not limited by the temperature at which sonication is performed so long as the temperature remains below the boiling point of the liquid. To illustrate this fact the starting mixture of Example 2 was subjected to the same sonication procedure for a period of 6 minutes, but without the use of the ice bath. At the end of the 6 minute period, the temperature was 132° F. This was well below the boiling point of the liquid and had no significant effect on the results achieved.

As has been indicated above, the present invention is applicable not only to liquids such as oils and the like but to perverulant solids, more particularly to such solids that are in fluid mixture with a gas or liquid. Soils which have been subject to chemical contamination and contaminated river bed sludges are examples of the type of solid materials that are well adapted for the treatment by ultrasonic radiation.

In the treatment of soil that has been contaminated by such toxins as polychlorinated biphenyls, dioxin, or the like, portions of the contaminated soil are removed and slurried with water and an alkaline agent such as sodium hydroxide, calcium hydroxide, sodium peroxide, or the like, to form an aqueous suspension. This suspension is then passed through an ultrasonic cell at a frequency and power intensity sufficient to cause cavitation. The effluent then comprises decontaminated soil and an aqueous alkaline phase containing the alkaline agent, plus any salts and organic fragments that have been formed by free radical reaction. The soil is then washed free of alkali, and dried, or returned as a slurry to the area from which it had been removed. Successive portions of the soil or river bed sludge can be treated in this manner until the entire area has been decontaminated.

The invention claimed is:

1. A method of removing undesirable halogenated aromatic compounds from a liquid or perverulent solid material which comprises applying ultrasonic radiation to said material in the presence of an alkaline agent in admixture with the material, said alkaline agent being present in the mixture in an amount that is at least as great as the halogen equivalent of said material, and said radiation being applied in sufficient amount to cause cavitation in the mixture.

2. The method of claim 1 wherein, the radiation is effected in the additional presence in the mixture of an effective amount of a wetting agent.

3. The method of claim 1 wherein the wetting agent is present in the mixture in a concentration of between about 0.01 to 0.1 weight percent.

4. The method of claim 1 wherein the alkaline agent is calcium hydroxide.

5. A method of detoxifying oil containing toxic halogenated aromatic compounds which comprises adding to the oil an amount of an alkaline agent that is at least as great as the halogen equivalent in the oil and then subjecting said mixture of oil and alkaline agent to sufficient ultrasonic radiation to cause cavitation in the mixture.

6. The method of claim 5 wherein said mixture also contains an effective amount of a wetting agent.

7. A method of detoxifying soil containing toxic halogenated aromatic compounds which comprises adding a sufficient amount of water to the soil to form an aqueous slurry, adding an alkaline agent in an amount that is at least as great as the halogen equivalent in the soil to form an aqueous suspension, subjecting the suspension to sufficient ultrasonic radiation to cause cavitation therein, whereby an effluent is formed containing decontaminated soil, removing the soil from the aqueous phase, and washing and drying the decontaminated soil.

8. The method of claim 7 wherein an effective amount of a wetting agent is added to the aqueous slurry prior to subjection to the radiation.

* * * * *